(12) United States Patent
Nishikai et al.

(10) Patent No.: US 10,838,668 B2
(45) Date of Patent: Nov. 17, 2020

(54) MANAGING DEVICE, APPARATUS MANAGING SYSTEM AND COMPUTER READABLE MEDIUM STORING MANAGING PROGRAM FOR PRINT RELATIONAL APPARATUS

(71) Applicant: KYOCERA Document Solutions Inc., Osaka (JP)

(72) Inventors: Kazuki Nishikai, Osaka (JP); Takeshi Nakamura, Osaka (JP); Satoshi Goshima, Osaka (JP); Dukil Park, Osaka (JP); Yuichi Obayashi, Osaka (JP); Takumi Nakamura, Osaka (JP); Koki Nakajima, Osaka (JP); Yasuo Nakashima, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/503,928

(22) Filed: Jul. 5, 2019

(65) Prior Publication Data
US 2020/0019350 A1   Jan. 16, 2020

(30) Foreign Application Priority Data

Jul. 12, 2018   (JP) .................................. 2018-132534

(51) Int. Cl.
*G06F 3/12* (2006.01)
*H04N 1/00* (2006.01)

(52) U.S. Cl.
CPC ............ *G06F 3/1204* (2013.01); *G06F 3/121* (2013.01); *G06F 3/1238* (2013.01); *G06F 3/1253* (2013.01); *H04N 1/00344* (2013.01)

(58) Field of Classification Search
CPC .... G06F 3/1204; G06F 3/1238; G06F 3/1253; G06F 3/121; H04N 1/00344
USPC ................................................ 358/1.15, 1.13
See application file for complete search history.

(56) References Cited

U.S. PATENT DOCUMENTS

2011/0099626 A1* 4/2011 Tsujimoto .......... H04N 1/00344
726/18

FOREIGN PATENT DOCUMENTS

| JP | 2000-132291 A | 5/2000 |
|---|---|---|
| JP | 2011-250150 A | 12/2011 |

* cited by examiner

*Primary Examiner* — Tammy Paige Goddard
*Assistant Examiner* — Darryl V Dottin
(74) *Attorney, Agent, or Firm* — Studebaker & Brackett PC

(57) ABSTRACT

A managing device used in an apparatus managing system including a print relational apparatus, terminals of users and a storing device manages the print relational apparatus and the users. The storing device stores user information of each user. The managing device includes a user authorizing part, a notification transmitting part and an information changing part. The user authorizing part authorizes, based on use history of the apparatus of each user, the user whose a nonuse period of the apparatus exceeds a predetermined period, as a registration erasure candidate user. The notification transmitting part transmits a registration erasure proposal notification having a proposal to erase registration of the candidate user to the terminal of a management user. The information changing part erases registration of the candidate user by erasing or changing the user information of the candidate user, according to indication inputted by the management user.

10 Claims, 9 Drawing Sheets

FIG. 3

USER INFORMATION

| REGISTRATION INFORMATION | USER ID | 123456789 | |
|---|---|---|---|
| | PASSWORD | WDBLWHyw | |
| | USER NAME | XXXX | |
| | MAIN GROUP NAME | MMMM | |
| | SUB GROUP NAME | NNNN | |
| | MAIL ADDRESS | aaa@bbb.ccc | |
| | USER TYPE | GENERAL | |
| | SPECIFIED APPARATUS ID | 000111222 | |
| APPARATUS SETTING VALUE | COPY | SHEET SIZE | A4 |
| | | ZOOMING RATE | 100% |
| | | COLOR/MONOCHROME | MONOCHROME |
| | | SINGLE/DUAL | DUAL |
| | FACSIMILE | DOCUMENT SIZE | A4 |
| | | RESOLUTION | 200×100 dpi |
| | | DENSITY | NORMAL |
| | MAIL TRANSMISSION | COLOR/MONOCHROME | COLOR |
| | | RESOLUTION | 300×300 dpi |
| | | FILE FORMAT | PDF |
| | NOTIFICATION RULE | SHEET EMPTY | ON |
| | | TONER EMPTY | ON |
| | | PART REPLACEMENT | OFF |
| | | JAM | ON |
| | | PROCESS ERROR | ON |
| | | MAINTENANCE SCHEDULE | ON |
| | | MONTHLY REPORT | OFF |
| | | FIRMWARE UPDATE | OFF |

FIG. 4

APPARATUS INFORMATION

| REGISTRATION INFORMATION | APPARATUS ID | 000111222 |
|---|---|---|
| | PRODUCT NUMBER | 898975460012 |
| | APPARATUS MODEL | MULTIFUNCTION PERIPHERAL |
| | PRODUCT NAME | CK0089FC |
| | MAIN GROUP NAME | MMMM |
| | SUB GROUP NAME | NNNN |
| | IP ADDRESS | xxx.xxx.xxx.xxx |

FIG. 7

```
| TREATMENT TO REGISTRATION ERASURE CANDIDATE USER |

USER ID   :  123456789
    USER NAME :  XXXX
      REASON  :  NOT LOG IN FOR ONE YEAR
    TREATMENT :
                ◉ REGISTRATION ERASURE
                     ☑ TRANSFER APPARATUS SETTING VALUE
                              SUCCESSOR  [ MANAGEMENT USER |V]

○ RECOVERY
                ○ RESERVATION
                         RESERVATION PERIOD [ ONE MONTH |V]

USER ID   :  987654321
    USER NAME :  YYYY
      REASON  :  NOT LOG IN FOR ONE YEAR
    TREATMENT :
                ◉ REGISTRATION ERASURE
                     ☐ TRANSFER APPARATUS SETTING VALUE
                              SUCCESSOR  [ ————— |V]

○ RECOVERY
                ○ RESERVATION
                         RESERVATION PERIOD [ ONE MONTH |V]

USER ID   :  456789123
    USER NAME :  ZZZZ

[ CANCEL ]                          [ NEXT ]
```

FIG. 8

| TRANSFER APPARATUS SETTING VALUE | | |
|---|---|---|
| USER ID : 123456789 | | |
| USER NAME : XXXX | | |
| ☐ TRANSFER ALL | | |
| ☐ COPY | ☐ SHEET SIZE | A4 |
| | ☐ ZOOMING RATE | 100% |
| | ☐ COLOR/MONOCHROME | MONOCHROME |
| | ☐ SINGLE/DUAL | DUAL |
| ☐ FACSIMILE | ☐ DOCUMENT SIZE | A4 |
| | ☐ RESOLUTION | 200 × 100 dpi |
| | ☐ DENSITY | NORMAL |
| ☐ MAIL TRANSMISSION | ☐ COLOR/MONOCHROME | COLOR |
| | ☑ RESOLUTION | 300 × 300 dpi |
| | ☑ FILE FORMAT | PDF |
| ☑ NOTIFICATION RULE | ☑ SHEET EMPTY | ON |
| | ☑ TONER EMPTY | ON |
| | ☑ PART REPLACEMENT | OFF |
| | ☑ JAM | ON |
| | ☑ PROCESS ERROR | ON |
| | ☑ MAINTENANCE SCHEDULE | OFF |
| | ☑ MONTHLY REPORT | OFF |
| | ☑ FIRMWARE UPDATE | OFF |

[ CANCEL ]  [ NEXT ]

FIG. 10

```
                TREATMENT TO MAIL FAULT USER
    USER ID :    123456789
    USER NAME :  XXXX
    REASON :     MAIL DOES NOT ARRIVE
    TREATMENT :
                 ◉ RESET OF MAIL ADDRESS
                 ○ REGISTRATION ERASURE

USER ID :    654321987
    USER NAME :  VVVV
    REASON :     DOMAIN IS DIFFERED FROM OTHER USER
    TREATMENT :
                 ◉ RESET OF MAIL ADDRESS
                 ○ REGISTRATION ERASURE

USER ID :    123456789
    USER NAME :  XXXX

[ CANCEL ]                            [ NEXT ]
```

MANAGING DEVICE, APPARATUS MANAGING SYSTEM AND COMPUTER READABLE MEDIUM STORING MANAGING PROGRAM FOR PRINT RELATIONAL APPARATUS

INCORPORATION BY REFERENCE

This application is based on and claims the benefit of priority from Japanese Patent application No. 2018-132534 filed on Jul. 12, 2018, the entire contents of which are incorporated herein by reference.

BACKGROUND

The present disclosure relates to a managing device for a print relational apparatus, an apparatus managing system for the print relational apparatus and a computer readable medium storing a managing program executed in the managing device of the print relational apparatus.

For example, in a company or the like, a plurality of print relational apparatuses, such as a multifunction peripheral, a printer, a copying machine or a facsimile, may be used. A user using the print relational apparatus must perform management of the print relational apparatuses, such as treatment of troubles of a paper jam and others, replacement of consumables of a toner and others, monitoring of consumption (running cost) of the paper and the toner. In the company or the like using the plurality of print relational apparatuses, a load of such management of the print relational apparatuses is increased. Recently, in order to reduce the management load of the print relational apparatuses in the company or the like, a service performing management of the plurality of print relational apparatuses by a managing server is provided and the print relational apparatuses used in the company or the like are connected to the managing server via a computer network, such as an internet.

Moreover, when the print relational apparatus is used for performing print, copy or the like of a document, it is feared that information described in the document is leaked. Therefore, the print relational apparatus may include a function registering the user of the print relational apparatus and allowing use of the print relational apparatus to only the registered user. In a case where the plurality of print relational apparatuses having such a function are used in the company or the like, the company or the like is forced to perform complicated work managing the user using the print relational apparatuses. Now, a service is provided so as to perform management of the user using the print relational apparatuses, in addition to management of the print relational apparatuses, in the managing server. According to this service, it is possible reduce both loads of management of the print relational apparatuses in the company or the like and management of the user using the print relational apparatuses.

Incidentally, in a case where the company or the like manages the user of the print relational apparatuses by using the above-mentioned service, there is a problem that it is difficult to except the user, who formerly used the print relational apparatuses and does not use them at present, from a management object.

For example, in the company or the like, in a case where an employee registered as the user of the print relational apparatus in the past stops use of the print relational apparatus due to personal changes or resignation, it is necessary to erase registration of the employee. However, the erasure of registration is often forgotten. With respect to registration of the employee, because the employee cannot use the print relational apparatuses to perform works and direct hindrance to works occurs if the employee is not registered, registration is hardly forgotten. By contrast, because direct hindrance to works does not occur if registration is not erased, registration erasure of the employee is often forgotten. Further, if a long period of time is elapsed in a state that registration erasure of the employee is forgotten on personal changes or resignation of the employee, it is difficult to specify registration information of the employee and registration erasure work become more difficult.

SUMMARY

In accordance with the present disclosure, a managing device is used in an apparatus managing system including a print relational apparatus, a plurality of terminals used by a plurality of users of the print relational apparatus and a storing device, and manages the print relational apparatus and the users. The storing device stores apparatus information having registration information of the print relational apparatus and stores user information having registration information of each user for the respective user. The managing device includes a user authorizing part, a notification transmitting part and an information changing part. The user authorizing part authorizes, on the basis of use history of the print relational apparatus of each user, the user in a condition that a nonuse period of the print relational apparatus exceeds a predetermined period, out of the plurality of users, as a registration erasure candidate user. The notification transmitting part transmits a registration erasure proposal notification in which a proposal to erase registration of the registration erasure candidate user is described, to the terminal used by a management user out of the plurality of users. The information changing part erases registration of the registration erasure candidate user by erasing or changing the user information of the registration erasure candidate user in accordance with indication inputted by the management user via the terminal used by the management user.

In accordance with the present disclosure, a apparatus managing system includes a print relational apparatus, a plurality of terminals used by a plurality of users of the print relational apparatus, a storing device and a managing device managing the print relational apparatus and the users. The storing device stores apparatus information having registration information of the print relational apparatus and stores user information having registration information of each user for the respective user. The managing device includes a user authorizing part, a notification transmitting part and an information changing part. The user authorizing part authorizes, on the basis of use history of the print relational apparatus of each user, the user in a condition that a nonuse period of the print relational apparatus exceeds a predetermined period, out of the plurality of users, as a registration erasure candidate user. The notification transmitting part transmits a registration erasure proposal notification in which a proposal to erase registration of the registration erasure candidate user is described, to the terminal used by a management user out of the plurality of users. The information changing part erases registration of the registration erasure candidate user by erasing or changing the user information of the registration erasure candidate user in accordance with indication inputted by the management user via the terminal used by the management user.

In accordance with the present disclosure, a computer readable medium stores a managing program. The managing program is executed by a computer of a managing device.

The managing device is used in an apparatus managing system including a print relational apparatus, a plurality of terminals used by a plurality of users of the print relational apparatus, and a storing device, and manages the print relational apparatus and the users. The storing device stores apparatus information having registration information of the print relational apparatus and stores user information having registration information of each user for the respective user. The managing program authorizes, on the basis of use history of the print relational apparatus of each user, the user in a condition that a nonuse period of the print relational apparatus exceeds a predetermined period, out of the plurality of users, as a registration erasure candidate user. The managing program transmits a registration erasure proposal notification in which a proposal to erase registration of the registration erasure candidate user is described, to the terminal used by a management user out of the plurality of users. The managing program erases registration of the registration erasure candidate user by erasing or changing the user information of the registration erasure candidate user in accordance with indication inputted by the management user via the terminal used by the management user.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 3 is an explanatory drawing showing an example of user information in the apparatus managing system according to the embodiment of the present disclosure.

FIG. 4 is an explanatory drawing showing an example of apparatus information in the apparatus managing system according to the embodiment of the present disclosure.

FIG. 7 is an explanatory drawing showing an example of a screen displayed on a displaying part of a terminal of a management user, when the management user makes the managing server execute treatment to a registration erasure candidate user, in the apparatus managing system according to the embodiment of the present disclosure.

FIG. 8 is an explanatory drawing showing an example of a screen displayed on the displaying part of the terminal of the management user, when the management user makes the managing server execute transfer process of apparatus setting values of the registration erasure candidate user, in the apparatus managing system according to the embodiment of the present disclosure.

FIG. 10 is an explanatory drawing showing an example of a screen displayed on the displaying part of the terminal of the management user, when the management user makes the managing server execute treatment to a mail fault user, in the apparatus managing system according to the embodiment of the present disclosure.

DETAILED DESCRIPTION

Figure 1:
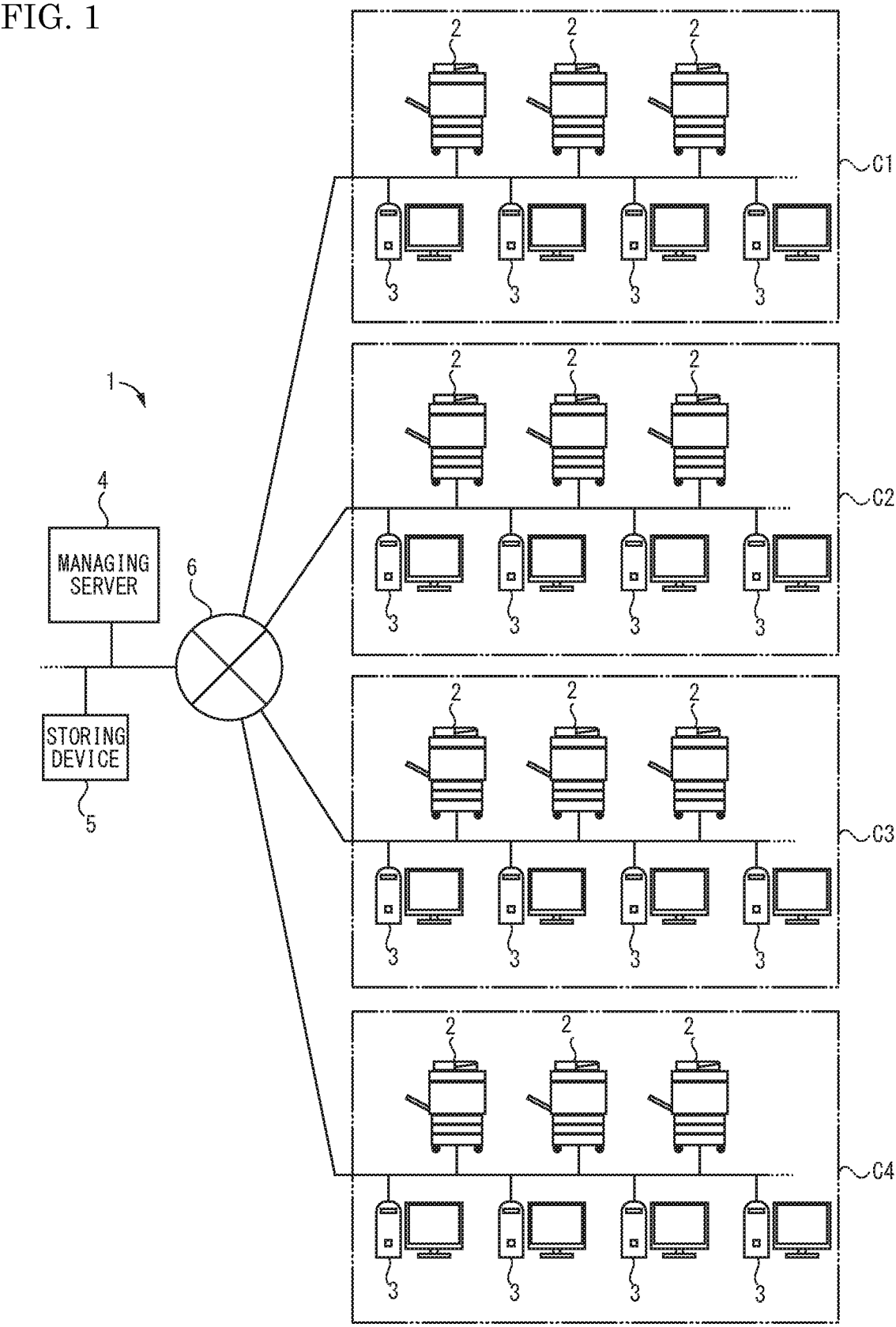
FIG. 1 is an explanatory drawing showing an apparatus managing system according to an embodiment of the present disclosure.

FIG. 1 illustrates an apparatus managing system 1 according to an embodiment of the present disclosure. As shown in FIG. 1, the apparatus managing system 1 includes a plurality of print relational apparatuses 2, a plurality of terminals 3, a managing server 4 as a managing device, and a storing device 5. Each print relational apparatus 2, each terminal 3 and the managing server 4 are mutually connected via a computer network 6, such as an internet. Moreover, the storing device 6 is connected to the managing server 4 via a computer network, such as a local area network. In addition, the plurality of print relational apparatuses 2 and the plurality of terminals 3 in the apparatus managing system 1 include, for example, the print relational apparatuses 2 and the terminals 3 used in a plurality of companies C1-C4, respectively.

The print relational apparatus 2 is an apparatus having a function printing an image on a sheet or a function reading an image or the like printed on a sheet, for instance, is a multifunction peripheral, a printer, a copying machine, a facsimile, a scanner or the like. In the present embodiment, as an example of the print relational apparatus 2, a multifunction peripheral having a print function, a copy function, a facsimile function, a mail transmission function, a scanner function and others, and including a printing mechanism of an electrographic manner is cited.

The terminal 3 is a device used by a user, for instance, is a personal computer, a tablet, a smart phone or the like. In the present embodiment, as an example of the terminal 3, a personal computer is cited.

The managing server 4 is a device managing the print relational apparatuses 2 and user using them, for instance, is a server computer.

The storing device 5 is a device having a non-volatile rewritable recording medium, for instance, is a hard disk device. In the storing device 5, user information and apparatus information described below are stored.

Figure 2:
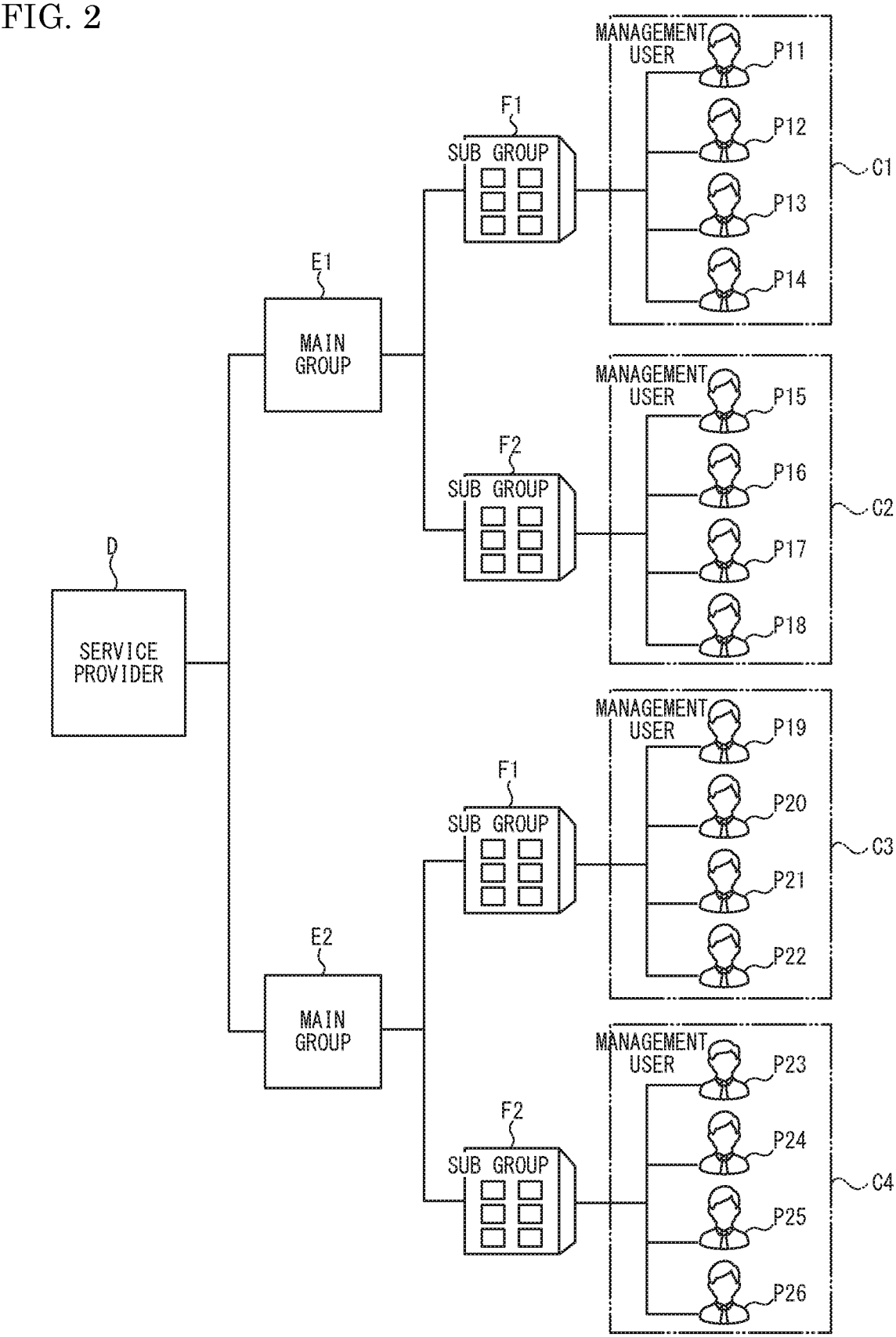
FIG. 2 is an explanatory drawing showing user managing structure in the apparatus managing system according to the embodiment of the present disclosure.

The apparatus managing system 1 provides an apparatus managing service performing management of the print relational apparatuses 2 and the uses using them. In the apparatus managing service, the managing server 4 of the apparatus managing system 1 executes management of the users under predetermined user managing structure. FIG. 2 illustrates an example of the user managing structure. In FIG. 2, a service provider D is a person providing the apparatus managing service. Users P11-P26 are persons registered as a user in the apparatus managing system 1 and persons allowed to use the print relational apparatus 2 specified for each user and being an object of management in the apparatus managing system 1. Moreover, in the example of FIG. 2, the users P11-P14 belong to the company C1, the users P15-P18 belong to the company C2, the users P19-P22 belong to the company C3, and the users P23-P26 belong to the company C4.

In the user managing structure, the respective users are divided main groups and the respective users belonging into each main group are divided into sub groups. In the example of FIG. 2, the users P11-P18 of the companies C1 and C2 belong to the main group E1 and the users P19-P26 of the companies C3 and C4 belong to the main group E2. The main group is, for instance, a local area. Moreover, in the main group E1, the users P11-P14 in the company C1 belong to the sub group F1, and the users P15-P18 in the company C2 belong to the sub group F2. Further, in the main group E2, the users P19-P22 in the company C3 belong to the sub group F1, and the users P23-P26 in the company C4 belong to the sub group F2. The subgroup is the company in this example.

Further, in the user managing structure, at least one out of the plurality of users belonging to each sub group is the management user. The management user has an authority to manage the other users in the sub group to which the management user belongs. Concretely, the management user can perform registration and registration erasure of the other user in the sub group to which the management user belongs, setting and change of apparatus setting values, setting and change of notification rules, and others. In the example of FIG. 2, the user P11 is the management user of the sub group F1 in the main group E1, the user P15 is the management user of the sub group F2 in the main group E1, the user P19 is the management user of the sub group F1 in the main group E2, and the user P23 is the management user of the sub group F2 in the main group E2.

In the apparatus managing service, the managing server 4 of the apparatus managing system 1 executes management of the print relational apparatuses 2 under predetermined apparatus managing structure. Under the apparatus managing structure, the print relational apparatuses 2 are divided into main groups and sub groups similar to the users under the above-described user managing structure. For example, in FIG. 1, the print relational apparatuses 2 respectively used in the companies C1 and C2 belong to the main group E1, and the print relational apparatuses 2 respectively used in the companies C3 and C4 belong to the main group E2. In addition, in the main group E1, the print relational apparatuses 2 used in the company C1 belong to the sub group F1, and the print relational apparatuses 2 used in the company C2 belong to the sub group F2. Moreover, in the main group E2, the print relational apparatuses 2 used in the company C3 belong to the sub group F1, and the print relational apparatuses 2 used in the company C4 belong to the sub group F2.

The managing server 4 of the apparatus managing system 1 executes management of the uses on the basis of user information. The user information is set for each user. The user information of each user is stored in the storing device 5. FIG. 3 illustrates an example of the user information of one user. As shown in FIG. 3, the user information includes a user ID, a password, a user name, a main group name, a sub group name, a mail address, a specified apparatus ID, apparatus setting values, notification rules and others.

In the user information, the "user ID" is information identifying the user. The "main group name" is information identifying the main group to which the user belongs. The "sub group name" is information identifying the sub group to which the user belongs. The "mail address" is an address of e-mail of the user. The "specified apparatus ID" is an apparatus ID of the print relational apparatus 2 specified as the print relational apparatus 2 of which use is allowed to the user. The "apparatus setting values" are setting values for customizing operation or function of the above-described specified print relational apparatus 2. The "notification rules" are setting value determining kinds of notification transmitted from the managing server 4 to the user.

The user has an authority to use the specified print relational apparatus 2, i.e. the print relational apparatus 2 having the specified apparatus ID included in the user information of the user. When using the specified print relational apparatus 2, the user inputs the user ID and the password to the terminal 3 used by the user or the specified print relational apparatus 2 to log in the apparatus managing system 1. After logging in, the user can use the specified print relational apparatus 2.

Moreover, the user can customize operation or function of the specified print relational apparatus 2. That is, the user can optionally set the apparatus setting values about the specified print relational apparatus 2. For example, the user can optionally set an initial size of the sheet for copy in the specified print relational apparatus 2. The apparatus setting value set by the user is stored as a part of the user information in the storing device 5. When the user starts use of the specified print relational apparatus 2, the apparatus setting values included in the user information of the user are automatically inputted to the print relational apparatus 2 and the print relational apparatus 2 operates in accordance with the inputted apparatus setting values.

Further, the user can receive notification of a maintenance schedule, firmware update information and others of the print relational apparatus 2 with an e-mail from the managing server 4. For example, in a case where the mail address included in the user information is set to the terminal 3 used by the user, the notification is transmitted from the managing server 4 and received by the terminal 3 used by the user.

The managing server 4 of the apparatus managing system 1 executes management of the print relational apparatuses 2 on the basis of the apparatus information. The apparatus information is set for each print relational apparatus 2. The apparatus information for each print relational apparatus 2 is stored in the storing device 5. FIG. 4 illustrates an example of the apparatus information of one print relational apparatus 2. As shown in FIG. 4, the apparatus information includes the apparatus ID, a product number, an apparatus model, a product name, the main group name, the sub group name, an IP address and others.

In the apparatus information, the "apparatus ID" is information identifying the print relational apparatus 2. The "main group name" is information identifying the main group to which the print relational apparatus 2 belongs. The "sub group name" is information identifying the sub group to which the print relational apparatus 2 belongs.

The managing server 4 manages the print relational apparatuses 2 on the basis of the apparatus information. For example, the managing server 4, on the basis of the apparatus information, communicates with each of the print relational apparatuses 2, detects occurrence of toner empty, jam or the like, or recognizes toner amount or the like.

Figure 5:
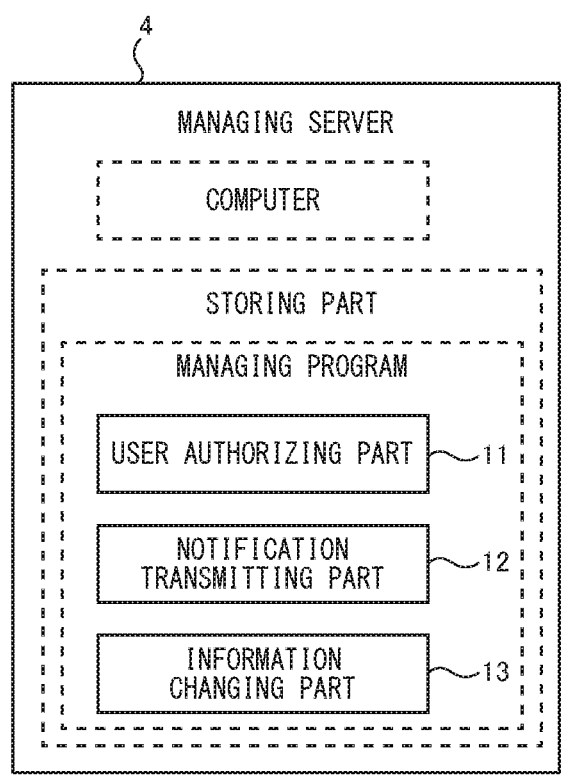
FIG. 5 is a block diagram showing a managing server as a managing device according to the embodiment of the present disclosure.

The managing server 4 of the apparatus managing system 1 manages, as described above, the print relational apparatuses 2 and the uses using them. Concretely, it executes registration erasure process and mail fault correction process described below. FIG. 5 illustrates structure of the managing server 4. As shown in FIG. 5, the managing server 4 includes a user authorizing part 11, a notification transmitting part 12 and an information changing part 13. These components of the managing server 4 are actualized by executing a managing program stored in a storing part (a computer readable medium), such as a ROM or a RAM, of the managing server 4 by a computer, such as a CPU, of the managing server 4. In other words, the computer of the managing server 4 executes the managing program stored in the storing part to function as the user authorizing part 11, the notification transmitting part 12 and the information changing part 13.

The user authorizing part 11 authorizes the user, being in a condition that a nonuse period of the print relational apparatus 2 exceeds a predetermined period (a nonuse reference period and an erasure reference period), as a registration erasure candidate user in the registration erasure process. Moreover, the user authorizing part 11 authorizes the user, being in a condition that a mail transmitted from the managing server 4 does not arrive and that erroneous of the mail address is estimated, as a mail fault user in the mail fault correction process.

The notification transmitting part 12 transmits registration erasure proposal notification, in which a proposal to erase registration of the registration erasure candidate user is described, to the management user in the registration erasure process. Moreover, the notification transmitting part 12 transmits mail fault correction proposal notification, in which a proposal to reset the mail address of the mail fault user or a proposal to erase registration of the mail fault user is described, to the management user in the mail fault correction process.

The information changing part 13 erases registration of the registration erasure candidate user in accordance with indication of the management user in the registration erasure process. Moreover, the information changing part 13 transfer the apparatus setting values included in the user information of the registration erasure candidate user to the other user in the registration erasure process. Further, the information changing part 13 resets the mail address included in the user information of the mail fault user or erases registration of the mail fault user.

Figure 6:
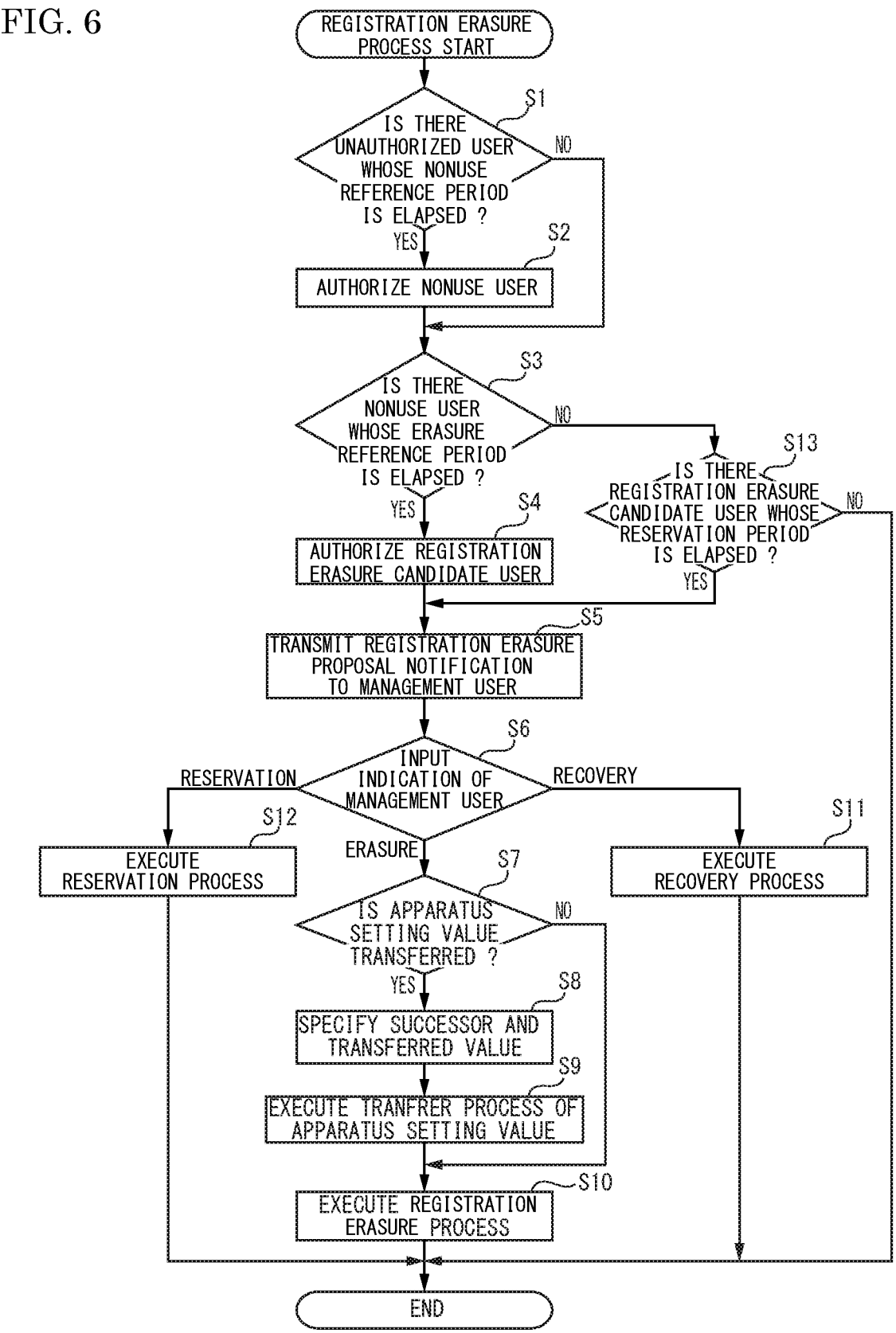
FIG. 6 is a flow chart showing registration erasure process in the managing server according to the embodiment of the present disclosure.

FIG. 6 illustrates registration erasure process by the managing server 4. The registration erasure process shown in FIG. 6 is repeatedly executed while the apparatus managing system 1 is running. In the registration erasure process, the user authorizing part 11 of the managing server 4 decides on the basis of use history of the print relational apparatus 2 of each user whether or not there is the user in a condition that the nonuse period of the specified print relational apparatus 2 exceeds the nonuse reference period (step S1), and authorizes, if there is such a user, the user as a nonuse user (step S2). The user authorized as the nonuse user loses a use authority of the specified print relational apparatus 2.

Moreover, the user authorizing part 11 decides whether or not there is the nonuse user in a condition that the erasure reference period is elapsed from authorization of the nonuse user (step S3), and authorizes, if there is such a nonuse user, the nonuse user as the registration erasure candidate user (step S4). That is, the user in a condition that the nonuse period of the specified print relational apparatus 2 exceeds the nonuse reference period is authorized as the nonuse user, and then, in a case where registration of the user is left for the erasure reference period, the user is authorized as the registration erasure candidate user.

In a case where the registration erasure candidate user is authorized, the notification transmitting part 12 transmits the registration erasure proposal notification, in which the proposal to erase registration of the registration erasure candidate user is described, to the management user of the sub group to which the authorized registration erasure candidate user belongs (step S5). For example, the registration erasure proposal notification is transmitted by an e-mail from the managing serer 4 to the terminal 3 used by the management user.

The management user can select any one out of registration erasure of the registration erasure candidate user, recovery of the registration erasure candidate user and reservation of treatment in accordance with the registration erasure proposal notification. The management user selects one out of three treatments and inputs indication for making the managing server 4 execute the selected treatment to the terminal 3 used by the management user. The indication inputted by the management user is transmitted from the terminal 3 used by the management user to the managing server 4 via the computer network 6 (step S6). Subsequently, the managing server 4 executes process on the basis of the indication inputted by the management user.

In a case where the management user inputs the indication for making the managing server 4 execute registration erasure of the registration erasure candidate user, the information changing part 13 of the managing server 4 executes transfer process of the apparatus setting values before erasing registration of the registration erasure candidate user. The transfer process of the apparatus setting values is process transferring the apparatus setting values included in the user information of the registration erasure candidate user to the user other than the registration erasure candidate user.

The transfer process of the apparatus setting values will be described concretely. The management user can optionally decide whether or not to perform the transfer process of the apparatus setting values. In a case where the management user inputs the indication performing the transfer process of the apparatus setting values (step S7: YES), the information changing part 13 starts the transfer process of the apparatus setting values in accordance with the indication.

Moreover, the management user can select the user as a successor of the apparatus setting values of the registration erasure candidate user out of the plurality of users (including the management user) in the sub group to which the registration erasure candidate user belongs. Further, as shown in FIG. 3, there are a plurality of apparatus setting values. The management user can select the apparatus setting value to be transferred out of the apparatus setting values of the registration erasure candidate user. The management user operates the terminal 4 used by the management user to select the user as the successor of the apparatus setting values of the registration erasure candidate user and the apparatus setting value to be transferred. According to this, the information changing part 13 specifies the user as the successor the apparatus setting values of the registration erasure candidate user and the apparatus setting value to be transferred (step S8).

Next, the information changing part 13 executes the transfer process of the apparatus setting values (step S9). Concretely, the information changing part 13 changes the apparatus setting value specified at step S8 out of the apparatus setting values included in the user information of the user specified at step S8 to the apparatus setting value included in the user information of the registration erasure candidate user.

Subsequently, the information changing part 13 executes the registration erasure process to erase registration of the registration erasure candidate user (step S10). Concretely, the information changing part 13 erases the user information of the registration erasure candidate user. Incidentally, in a case where the management user inputs the indication not performing the transfer process of the apparatus setting values (step S7: NO), the information changing part 13 erases registration of the registration erasure candidate user without executing the transfer process of the apparatus setting values.

On the other hand, in a case where the management user inputs the indication for making the managing server 4 execute recovery of the registration erasure candidate user, the managing server 4 executes recovery process (step S11).

In the recovery process, the managing server rescinds authorization as the registration erasure candidate user and authorization as the nonuse user with respect to the user authorized as the registration erasure candidate user. Thereby, this user acquires use authority of the specified print relational apparatus 2 again.

Moreover, in a case where the management user inputs the indication for reserving treatment to the registration erasure candidate user, the managing server 4 executes reservation process (step S12). In the reservation process, the managing server 4 adds date and time when indication of reservation is inputted as reservation start date and time to the user information of the registration erasure candidate user. The reservation start date and time becomes a calculation start point of reservation period for reserving treatment to the registration erasure candidate user. At step S13 in FIG. 6, the managing server 4 decides whether or not there is the user in a condition that the reservation period is elapsed. Subsequently, in a case where there is such a user, the notification transmitting part 12 transmits the registration erasure proposal notification, in which the proposal to erase registration of the registration erasure candidate user is described, to the management user in the sub group to which the registration erasure candidate user belongs (step S5). Thereby, the management user can select performing of registration erasure, recovering or reserving of treatment with respect to the registration erasure candidate user reserving treatment again.

FIG. 7 illustrates an example of a screen displayed on a displaying part (a display) of the terminal 3 of the management user, when the management user makes the managing server 4 execute treatment to the registration erasure candidate user. FIG. 8 illustrates an example of a screen displayed on the displaying part of the terminal 3 of the management user, when the management user makes the managing server 4 execute transfer process of the apparatus setting values.

The registration erasure proposal notification transmitted from the managing server 4 includes a means of starting a wizard screen accepting selection of treatment to the registration erasure candidate user and input of indication for making the managing server 4 execute the selected treatment. The means is, for instance, a link to a web page composed of the wizard screen. When the management user operates the terminal 3 used by the management user to start the wizard screen, the displaying part of the terminal 3 used by the management user displays a wizard screen shown in FIG. 7. On the screen, the user ID and the user name of the specified registration erasure candidate user, description of reason of authorization of the registration erasure candidate user, a radio button for selecting treatment performed to the registration erasure candidate user, a check box for selecting whether or not to transfer the apparatus setting value, a pull-down menu for selecting the user as the successor, a pull-down menu for setting the reservation period and others are displayed.

On the screen shown in FIG. 7, when the management user selects registration erasure, selects transfer of the apparatus setting values and pushes a "next" button, a screen as shown in FIG. 8 is displayed on the displaying part of the terminal 3 used by the management user. On the screen, a check box for selecting the apparatus setting values to be transferred and others are displayed. On the screen shown in FIG. 8, the management user selects the optional apparatus setting values and pushes a "next" button, the transfer process of the apparatus setting values and the registration erasure process of the registration erasure candidate user are executed.

Alternatively, on the screen shown in FIG. 7, when the management user selects registration erasure, selects non-transfer of the apparatus setting values and pushes the "next" button, the transfer process of the apparatus setting values is not executed and only the registration erasure process of the registration erasure candidate user is executed. Or, on the screen shown in FIG. 7, when the management user selects recovery or reservation and pushes the "next" button, the recovery process or the reservation process is executed according to selection by the management user.

Moreover, in a case where a plurality of registration erasure candidate users are simultaneously authorized, the registration erasure proposal notification, in which the proposal to erase registration of the plurality of registration erasure candidate users is described together, to the management user. In this case, when the management user performs operation starting the wizard screen from the registration erasure proposal notification, the wizard screen accepting treatment to the plurality of registration erasure candidate users simultaneously authorized together is started. For example, on a screen displayed on the displaying part of the terminal 3 by starting the wizard screen, as shown in FIG. 7, with respect to the plurality of registration erasure candidate users simultaneously authorized, the user IDs and the user names, descriptions of authorization reason, the radio buttons for selecting treatment and others are displayed. The management user can select treatment to the plurality of registration erasure candidate users simultaneously authorized all at once in accordance with this wizard screen. It is certainly possible to select different treatment for each registration erasure candidate user. Subsequently, in this case, the managing server 4 continuously executes treatment to each of the plurality of registration erasure candidate users simultaneously authorized in accordance with selection by the management user.

Figure 9:
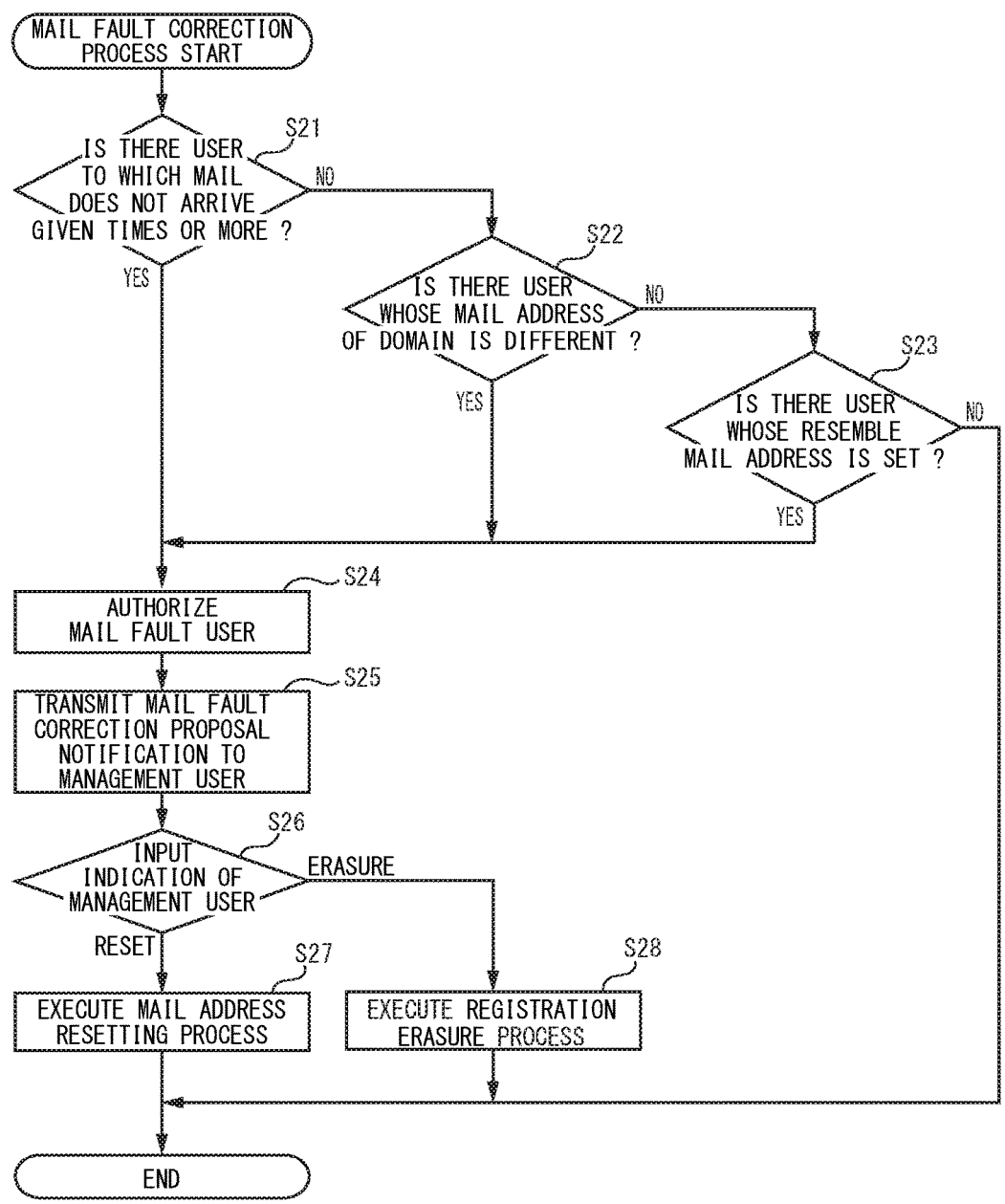
FIG. 9 is a flow chart showing mail fault correction process in the managing server according to the embodiment of the present disclosure.

FIG. 9 illustrates the mail fault correction process in the managing server 4. The mail fault correction process shown in FIG. 9 is repeatedly executed while the apparatus managing system 1 is running. In the mail fault correction process, the user authorizing part 11 of the managing server 4 decides whether or not there is the user in a condition that the number of times that the e-mail transmitted from the managing server 4 in accordance with the mail address included in the user information does not arrive the user exceeds a predetermined number of times (step S21).

Moreover, the user authorizing part 11 decides whether or not there is the user in a condition that erroneous of the mail address is estimated on the basis of character string composing the mail address included in the user information. Concretely, the user authorizing part 11 decides whether or not there is the user in a condition that a domain of the mail address included in the user information is different from a domain of the mail address included in the user information of the other user belonging to the same sub group (step S22). Further, the user authorizing part 11 decides whether or not there is the user in a condition that the mail address included in the user information is resemble in the mail address included in the user information of the other user belonging to the same sub group (e.g. the user in a condition that the mail address included in the user information is different by one character from the mail address included in the user information of the other user belonging to the same sub group) (step S23).

In a case where there is the user in the condition that the number of times that the e-mail transmitted from the managing server 4 in accordance with the mail address included in the user information does not arrive the user exceeds the predetermined number of times, or in a case where there is the user in the condition that erroneous of the mail address is estimated on the basis of character string composing the mail address included in the user information (step S21, step S22 or S23: YES), the user authorizing part 11 authorizes the user as the mail fault user (step S24).

In a case where the mail fault user is authorized, the notification transmitting part 12 of the managing server 4 transmits the mail fault correction proposal notification, in which the proposal to reset the mail address of the authorized mail fault user or the proposal to erase registration of the authorized mail fault user is described, to the management user in the sub group to which the authorized mail fault user belongs (step S25). For example, the mail fault correction proposal notification is transmitted with an e-mail from the managing server 4 to the terminal 3 used by the management user.

The management user can select any one out of resetting of the mail address of the mail fault user and registration erasure of the mail fault user in accordance with the mail fault correction proposal notification. The management user selects one out of these treatments and inputs indication for making the managing server 4 execute the selected treatment to the terminal 3 used by the management user. The indication inputted by the management user is transmitted from the terminal 3 used by the management user to the managing server 4 via the computer network 6 (step S26). Subsequently, the managing server 4 executes process on the basis of the indication inputted by the management user.

In a case where the management user inputs the indication for making the managing server 4 execute resetting of the mail address of the mail fault user, the information changing part 13 of the managing server 4 executes mail address resetting process (step S27). Concretely, the information changing part 13 requests the management user to input the correct mail address of the mail fault user and, in a case where the management user inputs the correct mail address of the mail fault user, changes the erred mail address included in the user information of the mail fault user to the correct mail address inputted by the management user. Subsequently, the managing server 4 rescinds authorization as the mail fault user with respect to the mail fault user.

On the other hands, in a case where the management user inputs the indication for making the managing server 4 execute registration erasure of the mail fault user, the information changing part 13 of the managing server 4 executes the registration erasure process (step S28). Concretely, the information changing part 13 erases the user information of the mail fault user.

FIG. 10 illustrates an example of a screen displayed on the displaying part of the terminal 3 of the management user, when the management user makes the managing server 4 execute treatment to the mail fault user. The mail fault correction proposal notification transmitted from the managing server 4 includes a means of starting a wizard screen accepting selection of treatment to the mail fault user and input of indication for making the managing server 4 execute the selected treatment. The means is, for instance, a link to a web page composed of the wizard screen. When the management user operates the terminal 3 used by the management user to start the wizard screen, the displaying part of the terminal 3 used by the management user displays a wizard screen shown in FIG. 10. On the screen, the user ID and the user name of the specified mail fault user, description of reason of authorization of the mail fault user, a radio button for selecting treatment performed to the mail fault user and others are displayed.

On the screen shown in FIG. 10, when the management user selects resetting of the mail address and pushes a "next" button, a screen for inputting the correct mail address is displayed on the displaying part of the terminal 3 used by the management user. The management user can inputs the correct mail address on the screen and makes the managing server 4 execute the mail address resetting process. Alternatively, on the screen shown in FIG. 10, when the management user selects registration erasure and pushes the "next" button, the registration erasure process of the mail fault user is executed by the managing server 4.

Moreover, in a case where a plurality of mail fault users are simultaneously authorized, the mail fault correction proposal notification, in which the proposal to reset the mail addresses of the plurality of mail fault users and the proposal to erase registration of the plurality of mail fault users are described together, to the management user. In this case, when the management user performs operation starting the wizard screen from the mail fault correction proposal notification, the wizard screen accepting treatment to the plurality of mail fault users simultaneously authorized together is started. The management user can select treatment to the plurality of mail fault users simultaneously authorized all at once in accordance with this wizard screen and make the managing server 4 continuously execute treatment to each of the plurality of mail fault users.

As described before, the managing server 4 according to the present embodiment of the present disclosure authorizes the user, being in a condition that the nonuse period of the print relational apparatus 2 exceeds the predetermined period (the nonuse reference period and the erasure reference period), as the registration erasure candidate user, transmits the registration erasure proposal notification, in which the proposal to erase registration of the registration erasure candidate user is described, to the management user, and executes process erasing registration of the registration erasure candidate user in accordance with indication by the management user accepting the proposal described in the registration erasure proposal notification. In a case where there is the user in the condition that the nonuse period of the print relational apparatus 2 exceeds the predetermined period, there is a high possibility that the user is an already personal-changed or resigned employee, or there is a high possibility that registration of the user is erroneous of registration. The managing server 4 can make the management user notice remained registration of the personal-changed or resigned person as the user of the print relational apparatus 2 or erroneous of registration of the user by transmitting the registration erasure proposal notification to the management user. Thereby, the management user can easily and surely perform registration erasure of the personal-changed or resigned person or rescission of erroneous of registration.

Moreover, the managing server 4 changes the apparatus setting values included in the user information the user other than the registration erasure candidate user to the apparatus setting values included in the user information the registration erasure candidate user in accordance with indication by the management user. Thereby, the apparatus setting values set by the user to be erased registration are transferred to the user other than the registration erasure candidate user. The apparatus setting values may have know-how with respect to use of the print relational apparatus 2 and works performed by using the print relational apparatus 2. For example, when the document is scanned and transmitted with a mail to a client, selection of resolution of a document image in order to optimize minuteness and data size of the document image acquired by scanning is the know-how with respect to use of the print relational apparatus 2 and works performed by using the print relational apparatus 2. Even if the apparatus setting values are lost by registration erasure of the registration erasure candidate user, the above-described know-how is lost. Further, if the management user fears loss of the above-described know-how and hesitates registration erasure of the already personal-changed or resigned person, as a result, it is feared that registration information of the person not using the print relational apparatus 2 is remained and such unnecessary registration information is accumulated as time is elapsed. If the unnecessary registration information is accumulated, the number of the users as a management object is increased and use cost of the apparatus managing service is increased. This is unpreferable for the user of the apparatus managing service. According to the managing server 4, since the apparatus setting values set by the user to be erased registration are transferred to the user other than the registration erasure candidate user, it is possible to prevent loss of the above-described know-how. In addition, since loss of the above-described know-how can be prevented, the management user can perform registration erasure of the already personal-changed or resigned employee without hesitating and it is possible to prevent accumulation of the unnecessary registration information.

Further, the managing server 4 according to the present embodiment of the present disclosure authorizes the user in a condition that the number of times that the e-mail does not arrive the user exceeds the predetermined number of times, the user in a condition that the domain of the mail address included in the user information is different from the domain of the mail address included in the user information of the other user belonging to the same sub group, or the user in a condition that the mail address included in the user information is resemble in the mail address included in the user information of the other user belonging to the same sub group, as the mail fault user, transmits the mail fault correction proposal notification, in which the proposal to reset the mail address of the mail fault user and the proposal to erase registration of the mail fault user are described, to the management user, and executes resetting of the mail address included in the user information of the mail fault user or registration erasure of the mail fault user in accordance with indication by the management user accepting any proposal described in the mail fault correction proposal notification. In a case where the number of times that the e-mail does not arrive the user exceeds the predetermined number of times, erroneous of the mail address included in the user information of the user is estimated. In addition, in a case where the domain of the mail address included in the user information is different from the domain of the mail address included in the user information of the other user belonging to the same sub group, erroneous of the mail address included in the user information of the user is estimated. Moreover, in a case where the mail address included in the user information is resemble in the mail address included in the user information of the other user belonging to the same sub group, erroneous of the mail address included in the user information of the user is estimated. The managing server 4 can make the management user notice that erroneous of the mail address included in the user information of the user is estimated, by transmitting the mail fault correction proposal notification to the management user. Thereby, the management user can easily and surely correct erroneous of the mail address of the user or easily and surely erase registration of the user of the erred mail address.

Moreover, in the managing server 4 according to the present embodiment of the present disclosure, the registration erasure proposal notification includes the link to the wizard screen for accepting input of indication of registration erasure of the registration erasure candidate user. Thereby, the management user can easily and surely perform registration erasure work of the registration erasure candidate user by accessing this link. In addition, in the embodiment, the management user can perform treatment to the plurality of registration erasure candidate users all at once in accordance with the wizard. Thereby, the management user can quickly perform treatment to the plurality of registration erasure candidate users.

Further, in the managing server 4 according to the present embodiment of the present disclosure, the registration erasure proposal notification includes the link to the wizard screen for accepting input of indication of change of the apparatus setting values included in the user information of the user other than the registration erasure candidate user to the apparatus setting values included in the user information of the registration erasure candidate user. Thereby, the management user can easily and surely perform work transferring the apparatus setting values set to the user to be erased registration by the other user by accessing this link.

Moreover, in the managing server 4 according to the present embodiment of the present disclosure, the mail fault correction proposal notification includes the wizard screen for accepting input of indication of resetting of the mail address included in the user information of the mail fault user, or indication of registration erasure of the mail fault user. Thereby, the management user can easily and surely perform work correcting erroneous of the mail address of the user or work erasing registration of the user of the erred mail address by accessing this link. In addition, in the embodiment, the management user can perform treatment to the plurality of mail fault users all at once in accordance with the wizard screen. Thereby, the management user can quickly perform treatment to the plurality of mail fault users.

Incidentally, although the above-embodiment cites, as an example, a case where management of the users and the print relational apparatuses 2 are performed while the users and the print relational apparatuses 2 are respectively divided into the main groups and the sub groups, defining manner of hierarchy and the number of hierarchy in hierarchical structure of management of the users and the print relational apparatuses 2 are not limited. For example, defining manner of hierarchy and the number of hierarchy may be optically set on the basis of countries, regions, companies, floors, posts or the like. Alternatively, hierarchical structure may be not provided for management of the users and the print relational apparatuses 2.

Incidentally, although the above-embodiment cites, as an example, a case of transferring the apparatus setting values of the registration erasure candidate user to the other user, for example, other information, such as the notification rules, of the registration erasure candidate user may be transferred to the other user.

Moreover, although the above-embodiment cites, as an example, a case of executing authorization at two steps in which the user not using the print relational apparatus 2 is firstly authorized as the nonuse user and secondary authorized as the registration erasure candidate user, such steps may be provided for authorization of the registration erasure candidate user.

Further, although the above-embodiment cites, as an example, a case of transmitting the registration erasure proposal notification and the mail fault correction proposal notification with e-mail, transmitting manner of these notifications is not limited by this.

Furthermore, although the above-embodiment cites registration erasure, recovery and reservation as treatment performed by the management user to the registration erasure candidate user, treatment performed by the management user to the registration erasure candidate user may be only registration erasure, only registration erasure and recovery, or only registration erasure and reservation, or may include other treatment in addition to registration erasure, recovery and reservation. Moreover, although the above-embodiment cites resetting of the mail address and registration erasure as treatment performed by the management user to the mail fault user, treatment performed by the management user to the mail fault user may be only resetting of the mail address, or only registration erasure, or may include other treatment in addition to resetting of the mail address and registration erasure.

Moreover, although the above-embodiment erases the user information of the user in the registration erasure process of the user, it is not limited by this. For example, in the registration erasure process of the user, the user information of the user may be changed, e.g. by adding information of registration erasure to the user information of the user.

Incidentally, the present disclosure may be properly modified without departing from idea and spirit of the disclosure understandable from the claims and the specification, and the management device, the apparatus managing system and the program having such modification are included within a technical range of the present disclosure.

The invention claimed is:

1. A device used in an apparatus managing system including a print relational apparatus; a plurality of terminals used by a plurality of users of the print relational apparatus; and a data store that stores apparatus information having registration information of the print relational apparatus and storing user information having registration information of each user for the respective user, manages the print relational apparatus and the users, the user information of each user includes a mail address of the user, the device comprising:
a processor configured to,
authorize, on the basis of use history of the print relational apparatus of each user, the user in a condition that a nonuse period of the print relational apparatus exceeds a predetermined period, out of the plurality of users, as a registration erasure candidate user,
transmit a registration erasure proposal notification in which a proposal to erase registration of the registration erasure candidate user is described, to the terminal used by a management user out of the plurality of users,
erase registration of the registration erasure candidate user by erasing or changing the user information of the registration erasure candidate user in accordance with indication inputted by the management user via the terminal used by the management user,
authorize the user in a condition that a mail transmitted from the device in accordance with the mail address included in the user information does not arrive the user, or the user in a condition that an error of the mail address is determined on the basis of a character string composing the mail address included in the user information, out of the plurality of users, as a mail fault user,
transmit a mail fault correction proposal notification, in which a proposal to reset the mail address of the mail fault user or a proposal to erase registration of the mail fault user is described, to the terminal used by the management user, and
reset the mail address included in the user information of the mail fault user or erase registration of the mail fault user by erasing or changing the user information of the mail fault user, in accordance with indication inputted by the management user via the terminal used by the management user.

2. The device according to claim 1, wherein
the registration erasure proposal notification includes a link to a wizard screen for accepting input of indication of registration erasure of the registration erasure candidate user.

3. The device according to claim 1, wherein
the user information of each user includes an apparatus setting value for customizing operation or function of the print relational apparatus, and
the processor is further configured to change the apparatus setting value included in the user information of the user other than the registration erasure candidate user out of the plurality of users to the apparatus setting value included in the user information of the registration erasure candidate user in accordance with indication inputted by the management user via the terminal used by the management user.

4. The device according to claim 3, wherein
the registration erasure proposal notification includes a link to a wizard screen for accepting input of indication of change of the apparatus setting value included in the user information of the user other than the registration erasure candidate user to the apparatus setting value included in the user information of the registration erasure candidate user.

5. The device according to claim 1, wherein
the mail fault correction proposal notification includes a wizard screen for accepting input of indication of resetting of the mail address included in the user information of the mail fault user, or indication of registration erasure of the mail fault user.

6. An apparatus managing system comprising:
a print relational apparatus;
a plurality of terminals used by a plurality of users of the print relational apparatus;
a data store that stores apparatus information having registration information of the print relational apparatus and storing user information having registration information of each user for the respective user, the user information of each user includes a mail address of the user; and
a device managing the print relational apparatus and the users, the device includes a processor configured to,
authorize, on the basis of use history of the print relational apparatus of each user, the user in a condition that a nonuse period of the print relational apparatus exceeds a predetermined period, out of the plurality of users, as a registration erasure candidate user;
transmit a registration erasure proposal notification in which a proposal to erase registration of the registration erasure candidate user is described, to the terminal used by a management user out of the plurality of users; and
erase registration of the registration erasure candidate user by erasing or changing the user information of the registration erasure candidate user in accordance with indication inputted by the management user via the terminal used by the management user, authorize the user in a condition that a mail transmitted from the device in accordance with the mail address included in the user information does not arrive the user, or the user in a condition that an error of the mail address is determined on the basis of a character string composing the mail address included in the user information, out of the plurality of users, as a mail fault user, transmit a mail fault correction proposal notification, in which a proposal to reset the mail address of the mail fault user or a proposal to erase registration of the mail fault user is described, to the terminal used by the management user, and reset the mail address included in the user information of the mail fault user or erase registration of the mail fault user by erasing or changing the user information of the mail fault user, in accordance with indication inputted by the management user via the terminal used by the management user.

7. A computer readable medium storing a managing program, the managing program being executed by a processor of a device, the device being used in an apparatus managing system including a print relational apparatus; a plurality of terminals used by a plurality of users of the print relational apparatus; and a data store that stores apparatus information having registration information of the print relational apparatus and storing user information having registration information of each user for the respective user, and managing the print relational apparatus and the users, the user information of each user includes a mail address of the user, and the managing program is configured to, authorize, on the basis of use history of the print relational apparatus of each user, the user in a condition that a nonuse period of the print relational apparatus exceeds a predetermined period, out of the plurality of users, as a registration erasure candidate user, transmit a registration erasure proposal notification in which a proposal to erase registration of the registration erasure candidate user is described, to the terminal used by a management user out of the plurality of users, and erase registration of the registration erasure candidate user by erasing or changing the user information of the registration erasure candidate user in accordance with indication inputted by the management user via the terminal used by the management user, authorize the user in a condition that a mail transmitted from the device in accordance with the mail address included in the user information does not arrive the user, or the user in a condition that an error of the mail address is determined on the basis of a character string composing the mail address included in the user information, out of the plurality of users, as a mail fault user, transmit a mail fault correction proposal notification, in which a proposal to reset the mail address of the mail fault user or a proposal to erase registration of the mail fault user is described, to the terminal used by the management user, and reset the mail address included in the user information of the mail fault user or erase registration of the mail fault user by erasing or changing the user information of the mail fault user, in accordance with indication inputted by the management user via the terminal used by the management user.

8. A device used in an apparatus managing system including a print relational apparatus; a plurality of terminals used by a plurality of users of the print relational apparatus; and a data store that stores apparatus information having registration information of the print relational apparatus and storing user information having registration information of each user for the respective user, manages the print relational apparatus and the users, the user information of each user includes a mail address of the user, the device comprising:

a processor configured to, authorize the user in a condition that a mail transmitted from the device in accordance with the mail address included in the user information does not arrive the user, or the user in a condition that an error of the mail address is determined on the basis of a character string composing the mail address included in the user information, out of the plurality of users, as a mail fault user, transmit a mail fault correction proposal notification, in which a proposal to reset the mail address of the mail fault user or a proposal to erase registration of the mail fault user is described, to the terminal used by the management user; and reset the mail address included in the user information of the mail fault user or erase registration of the mail fault user by erasing or changing the user information of the mail fault user, in accordance with indication inputted by the management user via the terminal used by the management user.

9. An apparatus managing system comprising:

a print relational apparatus;

a plurality of terminals used by a plurality of users of the print relational apparatus;

a data store that stores apparatus information having registration information of the print relational apparatus and storing user information having registration information of each user for the respective user, the user information of each user including a mail address of the user; and a device managing the print relational apparatus and the users, the device includes a processor configured to, authorize the user in a condition that a mail transmitted from the device in accordance with the mail address included in the user information does not arrive the user, or the user in a condition that an error of the mail address is determined on the basis of a character string composing the mail address included in the user information, out of the plurality of users, as a mail fault user, transmit a mail fault correction proposal notification, in which a proposal to reset the mail address of the mail fault user or a proposal to erase registration of the mail fault user is described, to the terminal used by the management user; and reset the mail address included in the user information of the mail fault user or erase registration of the mail fault user by erasing or changing the user information of the mail fault user, in accordance with indication inputted by the management user via the terminal used by the management user.

10. A computer readable medium storing a managing program, the managing program being executed by a processor of a device, the device being used in an apparatus managing system including a print relational apparatus; a plurality of terminals used by a plurality of users of the print relational apparatus; and a data store that stores apparatus information having registration information of the print relational apparatus and storing user information having registration information of each user for the respective user, and managing the print relational apparatus and the users, the user information of each user includes a mail address of the user, the managing program is configured to, authorize the user in a condition that a mail transmitted from the device in accordance with the mail address included in the user information does not arrive the user, or the user in a condition that an error of the mail address is determined on the basis of a character string composing the mail address included in the user information, out of the plurality of users, as a mail fault user, transmit a mail fault correction proposal notification, in which a proposal to reset the mail address of the mail fault user or a proposal to erase registration of the mail fault user is described, to the terminal used by the management user, and reset the mail address included in the user information of the mail fault user or erases registration of the mail fault user by erasing or changing the user information of the mail fault user, in accordance with indication inputted by the management user via the terminal used by the management user.

\* \* \* \* \*